United States Patent
Wu

(10) Patent No.: US 7,267,905 B2
(45) Date of Patent: Sep. 11, 2007

(54) ALKALINE ELECTROCHEMICAL CELL HAVING A NON-CRIMPED CLOSURE

(75) Inventor: James Xixian Wu, North Olmsted, OH (US)

(73) Assignee: Eveready Battery Company, Inc., St. Louis, MI (US)

( * ) Notice: Subject to any disclaimer, the term of this patent is extended or adjusted under 35 U.S.C. 154(b) by 0 days.

(21) Appl. No.: 10/638,849

(22) Filed: Aug. 11, 2003

(65) Prior Publication Data

US 2004/0033417 A1    Feb. 19, 2004

Related U.S. Application Data

(63) Continuation of application No. 09/721,250, filed on Nov. 22, 2000, now Pat. No. 6,605,383.

(51) Int. Cl.
*H01M 2/02* (2006.01)
*H01M 2/04* (2006.01)
*H01M 2/08* (2006.01)

(52) U.S. Cl. .................... 429/185; 429/163; 429/164; 429/174

(58) Field of Classification Search .............. 429/171, 429/174, 175, 185, 163, 164
See application file for complete search history.

(56) References Cited

U.S. PATENT DOCUMENTS

| 3,285,784 | A | | 11/1966 | Babusci et al. |
| 4,263,380 | A | * | 4/1981 | Riedl .................... 429/162 |
| 4,401,733 | A | * | 8/1983 | Shirai et al. ............ 429/174 |
| 4,628,012 | A | | 12/1986 | Spahrbier |
| 4,690,879 | A | * | 9/1987 | Huhndorff et al. ....... 429/61 |
| 4,725,515 | A | * | 2/1988 | Jurca .................... 429/174 |
| 4,937,153 | A | | 6/1990 | Huhndorff |
| 5,332,633 | A | | 7/1994 | Adamson et al. |
| 5,843,597 | A | | 12/1998 | Getz |
| 5,856,040 | A | | 1/1999 | Newman et al. |

FOREIGN PATENT DOCUMENTS

| DE | 0152235 | 11/1981 |
| DE | 3443454 | 5/1986 |
| GB | 1368715 | 10/1974 |
| GB | 2088622 | 6/1982 |
| JP | 50008775 | 4/1975 |
| JP | 60077350 | 5/1985 |
| JP | 07073861 | 3/1995 |
| WO | WO9934457 | 7/1999 |

* cited by examiner

*Primary Examiner*—Gregg Cantelmo
(74) *Attorney, Agent, or Firm*—Michael C. Pophal

(57) ABSTRACT

An adhesive closure for sealing closed the open end of an electrochemical cell container. The electrochemical cell comprises a can having an open end and a side wall, and positive and negative electrodes disposed in the can. The cell also has a cover disposed on the open end of the can and having a peripheral wall radially outside of the side wall of the can. One or more adhesives are disposed between the outer side wall of the can and the peripheral wall of the cover for adhering the cover to the can.

2 Claims, 2 Drawing Sheets

ALKALINE ELECTROCHEMICAL CELL HAVING A NON-CRIMPED CLOSURE

CROSS-REFERENCE TO RELATED APPLICATION

This application is a continuation of application Ser. No. 09/721,250, filed Nov. 22, 2000, now U.S. Pat. No. 6,605,383, entitled "ALKALINE ELECTROCHEMICAL CELL HAVING ADHESIVE CLOSURE".

BACKGROUND OF THE INVENTION

The present invention generally relates to electrochemical cells, i.e., batteries, and more particularly to a sealed closure assembly for sealing closed the open end of an alkaline battery container.

Conventional alkaline electrochemical cells generally include a steel cylindrical can having a positive electrode, referred to as the cathode, which comprises manganese dioxide as the active material. The electrochemical cell also includes a negative electrode, referred to as the anode, which comprises zinc powder as the active material. In a bobbin-type cell construction, the cathode is typically formed against the interior surface of the sealed can, while the anode is generally centrally disposed in the can. Alternately, in jelly-roll cells, the anode and cathode are spirally wound. A separator is located between the anode and the cathode, and an alkaline electrolyte solution, typically comprising potassium hydroxide (KOH), simultaneously contacts the anode, the cathode, and the separator. A conductive current collector is commonly inserted into the anode active material, and a seal assembly, which includes a seal member, provides closure to the open end of the steel can to seal the active electrochemical materials in the sealed volume of the can.

Cylindrical alkaline cells are commonly closed by inserting a preassembled collector and seal assembly in the open end of the steel can such that the assembly is disposed in the interior of the steel can. The collector and seal assembly typically includes the collector nail, an annular nylon seal, and an inner metal cover radially supporting the nylon seal. The steel can typically has a taper or an inwardly extending bead at its open end which serves to support the collector and seal assembly in the desired orientation prior to securing it in place. After the collector and seal assembly has been inserted in the can, an outer metal cover is placed over the assembly and the assembly and cover are secured in place by radially squeezing the can against the collector and seal assembly and outer cover, and crimping the edge of the can over the peripheral edge of the collector and seal assembly and outer cover to secure the outer cover and collector and seal assembly within the open end of the steel can.

A sealant, such as asphalt, is sometimes applied at the can and seal interface to further prevent alkaline electrolyte solution from leaking through the crimped closure. The sealant serves the purpose of preventing leakage, while the crimped closure provides the structural mechanical strength to the can closure. The sealant is generally required to be chemically resistant to the battery internal ingredients, including alkaline electrolyte which typically comprises potassium hydroxide. With the conventional crimped closure techniques, the seal assembly consumes considerable volume inside of the can and limits the height available for the active electrochemical materials including the positive and negative electrodes.

Accordingly, it is desirable to provide for a non-crimped sealed closure to the open end of the container that offers a strong mechanical closure for an alkaline electrochemical cell. In addition, it is desirable to provide for a sealed closure that allows for extended height electrodes.

SUMMARY OF THE INVENTION

The present invention provides an adhesive closure to the open end of an alkaline electrochemical cell container in a manner that offers a strong mechanical bond and is resistant to the electrochemically active ingredients. To achieve this and other advantages, and in accordance with the purpose of the invention as embodied and described herein, the present invention provides for an electrochemical cell comprising a container having an open end and a side wall. Positive and negative electrodes are disposed in the container. A cover is disposed on the open end of the container, and preferably has a peripheral wall extending radially outside of the side wall of the container. An adhesive is disposed between the outer side wall of the container and the peripheral wall of the cover for adhering the cover to the container.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
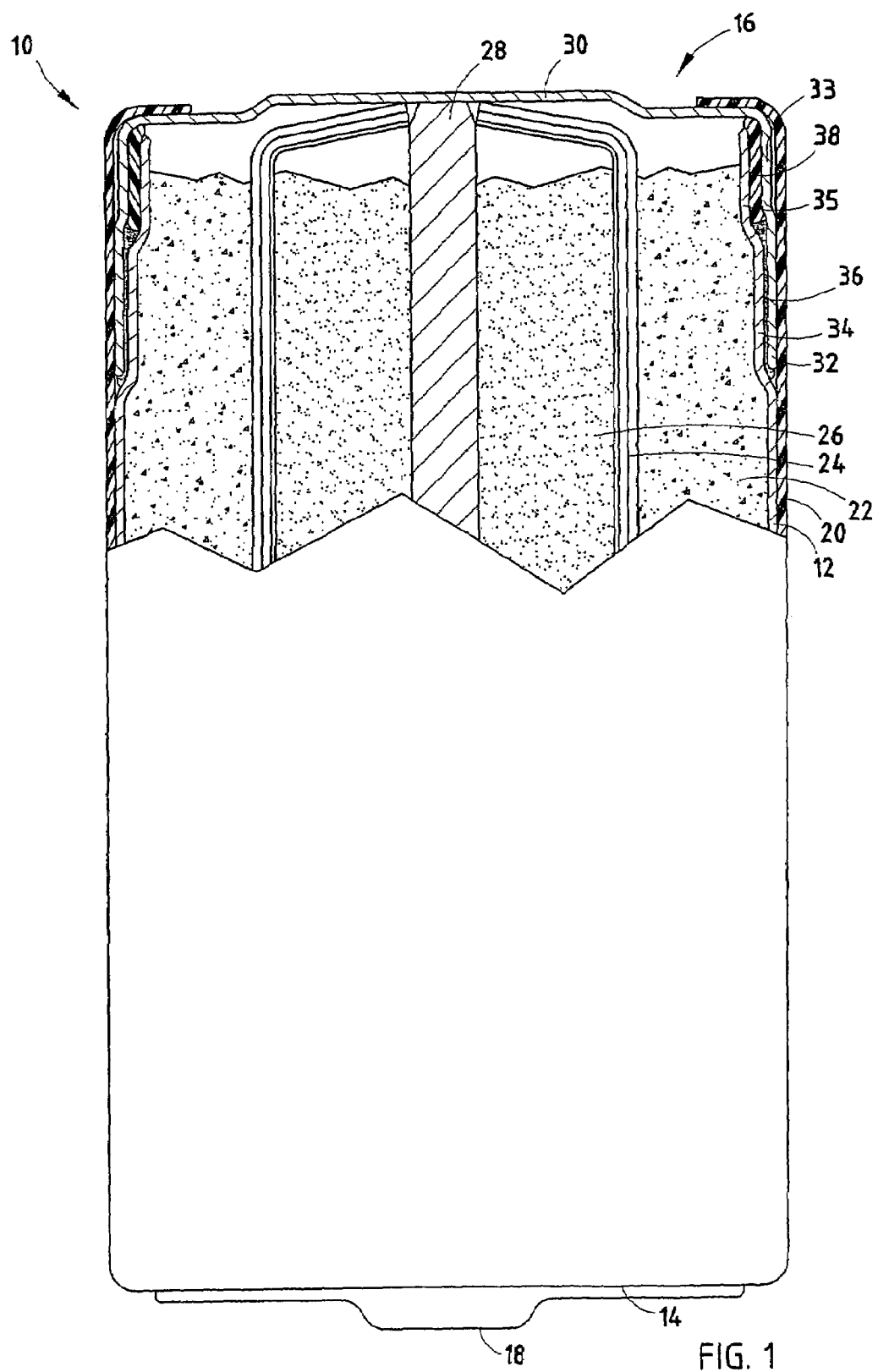
FIG. 1 is a partial longitudinal cross-sectional view of an electrochemical cell having an adhesive closure assembly for sealing closed the open end of the can according to a first embodiment of the present invention.

Referring to FIG. 1, a cylindrical alkaline electrochemical cell 10 is shown therein having an adhesive closure assembly for sealing closed the open end of the cell container according to a first embodiment of the present invention. The electrochemical cell 10 includes a cylindrical steel can 12 having a closed bottom end 14, an open top end 16, and side walls extending between the top and bottom ends. The closed bottom end 14 of can 12 includes a protruding nub 18 formed at its center region for providing the positive contact terminal of cell 10. The positive contact terminal 18 may be integrally formed in the bottom end 14 of the can 12, or could be welded or otherwise attached to a flat bottom end of the can 12.

Assembled to the open top end 16 of steel can 12 is a metal cover 30 which covers and seals closed the open end 16 of steel can 12. The metal cover 30 serves as the negative contact terminal of cell 10. The metal negative cover 30 is welded or otherwise electrically connected to a current collector 28 which may include a brass nail having an elongated body and an enlarged head at one end. The cover 30 is sealed closed against steel can 12 by way of an adhesive closure assembly as described herein according to the present invention.

A metalized, plastic film label 20 is formed about the exterior surface of steel can 12, except for the ends of steel can 12. Film label 20 is formed over the peripheral edge of the bottom end 14 of steel can 12 and may extend partially onto the negative cover 30 as shown.

A cathode 22 is formed about the interior surface of steel can 12. Cathode 22 may be formed of a mixture of manganese dioxide, graphite, potassium hydroxide solution, and additives, according to one example. A separator 24, which may be formed of a non-woven fabric that prevents migration of any solid particles in the cell, is disposed about the interior surface of cathode 22. An anode 26 is disposed with an electrolyte into the separator 24 and in contact with the current collector 28. The anode 26 can be formed of zinc powder, a gelling agent, and additives, according to one example. Accordingly, the cathode 22 is configured as the positive electrode, and the anode 26 is configured as the negative electrode. While a cylindrical bobbin-type cell construction is shown, it should be appreciated that the electrochemical cell 10 may otherwise be constructed, such as a jelly-roll cell construction or a miniature button-type cell construction.

The upper end of steel can 12 has inward stepped surfaces that extend radially inward toward the central longitudinal axis of steel can 12 at the open end. Steel can 12 includes a first inward stepped surface 34 that transitions radially inward at an inclined angle. Located between surface 34 and the open end 16 of steel can 12 is a second stepped surface 35 that further transitions radially inward at an inclined angle. The second stepped surface 35 is therefore located further radially inward as compared to the first stepped surface 34.

The negative cover 30 is generally cup-shaped having an outer peripheral wall that extends around the outside of side wall surfaces 34 and 35 of steel can 12. Accordingly, peripheral wall 32 is located radially outward from side wall surfaces 34 and 35 and extends substantially parallel thereto. Negative cover 30 includes a stepped surface 33 that conforms substantially to the transition of stepped surface 35 in steel can 12, and is configured to engage a seal member 38 to form a sealed closure. Peripheral wall 32 is bonded to the outside surface of steel can 12 via an adhesive layer 36 located along stepped surface 34. Adhesive layer 36 may include an epoxy, such as a two-part epoxy commercially available from Minnesota, Mining and Manufacturing Company, and sold as SCOTCH-WELD® 2216. The adhesive layer 36 employing an epoxy, such as the aforementioned, may include an epoxy resin such as Bisphenol A epoxy resin, having CAS number 25068-38-6, combined with a suitable polymer (hardener). It should be appreciated that other adhesives may be employed without departing from the teachings of the present invention. Examples of other suitable adhesives may include SCOTCH-WELD® epoxy adhesive DP-190, also commercially available from Minnesota, Mining and Manufacturing Company, five-minute epoxy resin having Bisphenol A diglyclydl ether resin, and also having CAS number 25068-38-6, and commercially available from ITW Devcon, and Armstrong MD-48 resin having the chemical name Bisphenol A/Epichlorohygrin based epoxy and CAS number 25068-38-6, and commercially available from Armstrong Products Division.

Located between stepped surface 35 of can 12 and stepped surface 33 of cover 30 is a nylon seal 38. Nylon seal 38 may be in the shape of a concentric ring and is preferably generally disposed above first stepped surface 34 to seal and prevent potassium hydroxide solution from leaking into contact with adhesive layer 36. Accordingly, the peripheral wall 32 of negative cover 30 extends radially outward and over the seal 38 and stepped side wall surfaces 34 and 35 of steel can 12 so as to adhere wall 32 to stepped surface 34 via adhesive layer 36 and compress seal 38 between the surface 33 of peripheral wall 32 and stepped surface 35 of steel can 12. The downward placement of negative cover 30 onto steel can 12 causes seal 38 to be compressed during and following curing of the adhesive layer 36. The adhesive layer 36 advantageously provides for a strong mechanical bond to maintain closure of the cover 30 against steel can 12, while seal 38 prevents the leakage of electrolyte solution from within the electrochemical cell 10 to the outside environment.

It should be appreciated that the cover assembly of the present invention is assembled to steel can 12 without the use of a crimped closure, thereby resulting in a non-crimped alkaline electrochemical cell. Instead, negative cover 30 is inserted over the top of the open end 16 of steel can 12 so that the peripheral wall 32 of cover 30 is disposed radially outward from the stepped surfaces 34 and 35 of the side walls of steel can 12. The outermost end of the peripheral wall 32 is adhered via the adhesive layer 36 to steel can 12 and sits over the angled incline leading to the first stepped surface 34. The adhesive layer 36 also serves as a dielectric to electrically isolate the negative cover 30 from steel can 12 so as to maintain a separation of positive and negative polarities, while at the same time mechanically adhering the negative cover 30 to steel can 12. In addition, the compressed seal 38 prevents leakage of alkaline electrolyte solution such that the adhesive layer does not come into contact with potassium hydroxide. Accordingly, the negative cover 30 may be disposed downward upon steel can 12 in a manner that compresses seal 38 between surface 35 of steel can 12 and peripheral wall 32 to provide a sealing engagement sufficient to prevent a leakage of alkaline electrolyte solution from within the internal volume of the electrochemical cell 10. By eliminating the need for a crimped closure, the electrochemical cell 10 advantageously allows for the cathode 22 and anode 26 to extend closer to the open end of steel can 12, and therefore offers greater available internal height for active electrochemical materials.

Figure 2:
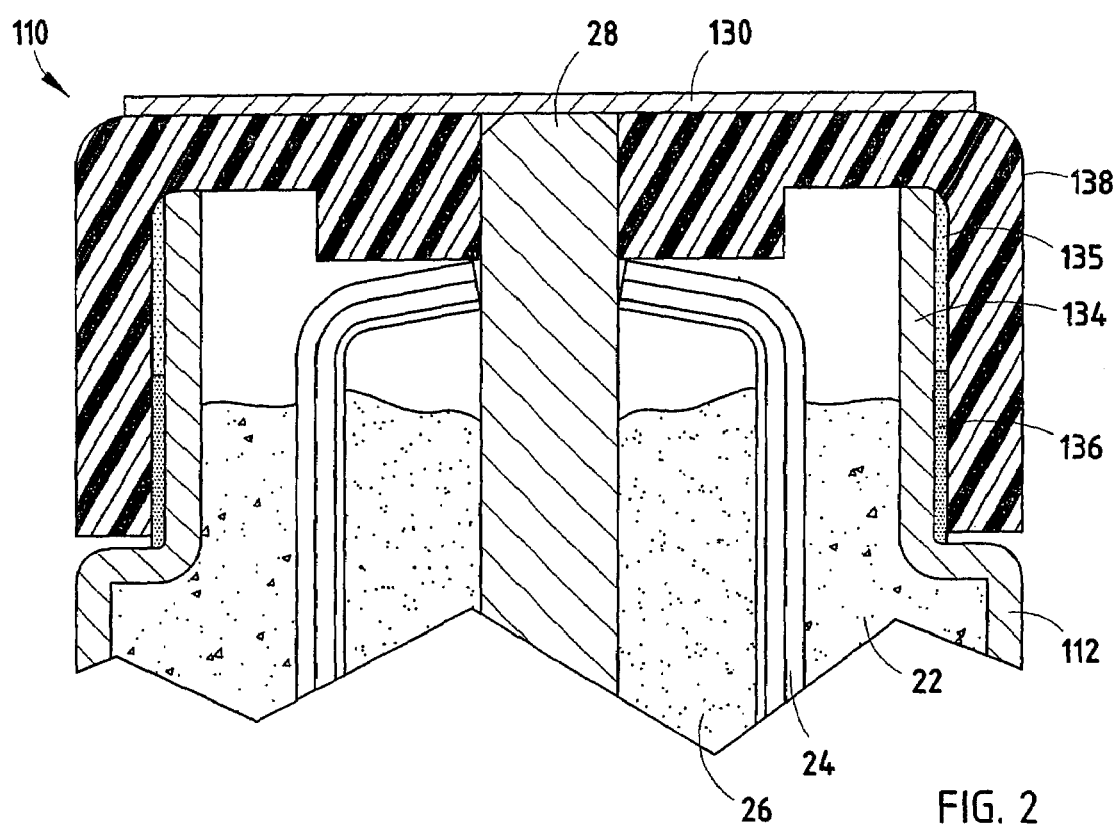
FIG. 2 is a partial longitudinal cross-sectional view of an electrochemical cell having an adhesive closure assembly for sealing closed the open end of the can according to a second embodiment of the present invention.

Referring to FIG. 2, the top portion of an alkaline electrochemical cell 110 is shown having an adhesive closure assembly according to a second embodiment of the present invention. Electrochemical cell 110 likewise includes a steel can 112 having a closed bottom end (not shown), side walls, and an open top end, a cathode 22, a separator 24, an anode 26, and a current collector 28. The side walls of steel can 112 include radially inwardly stepped surface 134 located near the open end of the steel can 112. Electrochemical cell 110 includes an outer negative cover 130 welded or otherwise connected to current collector 28. The current collector 28 is inserted into an opening hole in a polymeric seal 138 and may be bonded to a polymeric seal 138. Together, the seal 138 and negative cover 130 form a cover assembly for closing the open end of the steel can 112. Seal 138 is bonded to steel can 112 via an adhesive layer, shown as upper and lower portions 135 and 136, respectively. Polymeric seal 138 may be comprised of nylon or other suitable material.

More particularly, the inside surface of seal 138 is adhered to the outside surface of stepped surface 134 of steel can 112. Upper adhesive layer 135 is chemically compatible with potassium hydroxide alkaline electrolyte solution, and therefore is not susceptible to damage by the potassium hydroxide which would result in excessive leakage. Lower adhesive layer 135 is preferably likewise chemically compatible with potassium hydroxide alkaline electrolyte solution. Examples of adhesive layers 135 and 136 may include the epoxy resin as discussed above in connection with adhesive layer 36. However, it should be appreciated that lower adhesive layer 136 may employ other adhesives that are less resistant to damage caused by the potassium hydroxide, since the upper adhesive layer 135 prevents the passage of potassium hydroxide to the lower adhesive layer 136. Lower adhesive layer 136 may include adhesives such as Loctite product 3650 polyolefin hot melt adhesive, Loctite product 3642 polyamide hot melt adhesive, and urethane sealant, all commercially available from Loctite Corporation, and Dow Corning 730 solvent resistant sealant (100% fluoro silicone rubber), commercially available from Dow Corning Corporation. Seal 138 extends radially outside along the walls of steel can 112 so as to leave the open volume of steel can 112 available for active electrochemical materials. Accordingly, the anode 26 and cathode 22 may employ a greater height than what would otherwise be allowed with conventional crimped closure cell assemblies.

Accordingly, the present invention advantageously provides for an adhesive closure assembly to seal and close the open end of a battery container without requiring a crimped closure. The adhesively bonded cover is adhered and sealed against the battery can so as to prevent leakage of alkaline electrolyte solution, while providing strong mechanical bonding strength to maintain the cover sealed closed on the steel can. In addition, by adhesively bonding the cover on the outer walls of the steel can in cells 10 and 110, greater internal volume is available for active electrochemical electrode materials, which advantageously provides for enhanced service performance.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A bobbin-style electrochemical cell comprising:
a cylindrical can having an open end and a side wall;
a cover, positioned over the open end, consisting of a base and a peripheral wall extending axially away from the base wherein the peripheral wall has a terminal edge positioned radially outside of the outer the side wall;
a first adhesive disposed between at least a portion of an outer-facing length of the side wall and the peripheral wall so that the cover and the can are adhesively secured to form a non-crimped electrochemical cell container and wherein the can and the cover define an internal chamber in the non-crimped container;
a second adhesive disposed between the cover and the can wherein the first and second adhesives are located such that the first adhesive is axially closer to the open end relative to the second adhesive;
a first electrode disposed within the internal chamber of the non-crimped container;
a second electrode disposed within the internal chamber of the non-crimped container, wherein the second electrode is in contact with the side wall along substantially all of an entire inner-facing length of the side wall;
a current collector disposed within the internal chamber, said current collector in electrical contact with the cover at one end and completely surrounded by the first electrode at an opposing end; and
an alkaline electrolyte solution disposed within the internal chamber of the non-crimped container.

2. The electrochemical cell as defined in claim 1, wherein the first adhesive comprises an epoxy having Bisphenol A.

* * * * *